United States Patent [19]

Jehanno

[11] Patent Number: 4,664,056
[45] Date of Patent: May 12, 1987

[54] IRREVERSIBLE THRESHOLD-TEMPERATURE INDICATOR

[75] Inventor: Jean-Vincent Jehanno, Lyons, France

[73] Assignee: Societe Civile Dite "G.I.R.", Marseilles, France

[21] Appl. No.: 701,604

[22] Filed: Feb. 14, 1985

[30] Foreign Application Priority Data

Feb. 14, 1984 [FR] France ................... 84 02905

[51] Int. Cl.⁴ .................. G01K 11/06; G01K 11/08
[52] U.S. Cl. .................................. 116/217; 116/160; 116/162
[58] Field of Search ............... 116/216, 217, 218, 219, 116/220, 221, 212; 60/527; 374/160, 162, 206, 207

[56] References Cited

U.S. PATENT DOCUMENTS

| | | | |
|---|---|---|---|
| 3,403,238 | 9/1968 | Buehler | 60/527 |
| 3,516,082 | 6/1970 | Cooper | 116/216 |
| 3,615,719 | 10/1971 | Michel | 116/221 |
| 3,841,551 | 10/1974 | Ota | 60/527 |
| 3,844,248 | 10/1974 | Parker | 116/212 |
| 4,032,071 | 6/1977 | Imoto | 137/468 |
| 4,038,936 | 8/1977 | Kessler | 116/219 |
| 4,325,217 | 4/1982 | Golestanch | 60/527 |
| 4,490,976 | 1/1985 | Johnson | 60/527 |

OTHER PUBLICATIONS

Title—Proceedings of the International Conference on Martensitic Transformation ICOMAT 1979—Cambridge, Mass. USA, 24-29 Jun. 1979, pp. i-xv. Dept of Materials Science & Engineering, Mass Inst. of Tecnology, Cambridge, Mass. 02139.

Primary Examiner—Charles Frankfort
Assistant Examiner—Denis E. Corr
Attorney, Agent, or Firm—Karl F. Ross; Herbert Dubno

[57] ABSTRACT

A temperature-monitoring and -witnessing device has an at least partially transparent container forming a pair of adjacent chambers at least one of which is substantially closed and formed with a passage between the chambers, a valve including a metallic shape-memory element that deforms from one shape to another shape when cooled to a predetermined transition temperature for blocking the passage when the element is of the one shape and for unblocking the passage when the element is of the other shape, a body of liquid in the one closed chamber and confined therein when the shape-memory element is of the one shape, and a dye or the like in the other chamber capable of coloring the liquid. Thus the liquid will only be colored when the element has deformed to the other shape and the device is below the transition temperature. Normally the liquid has a freezing point generally at the transition temperature. For self-readying action, remelting of the liquid serves to indicate that an upper threshold has been crossed.

9 Claims, 19 Drawing Figures

FIG_16

FIG_17

FIG_18

FIG_19

IRREVERSIBLE THRESHOLD-TEMPERATURE INDICATOR

FIELD OF THE INVENTION

The present invention relates to a temperature indicator. More particularly this invention concerns a so-called witness which indicates in an irreversible or unresettable manner when a threshold temperature has been passed.

BACKGROUND OF THE INVENTION

In many fields it it is important to know when a specific threshold temperature has been passed by a particular commodity, machine, or the like. For various reasons it is valuable to know if at any time one or more threshold temperatures have been passed by the thing being monitored, especially when it has not been under the control of the person most concerned with this threshold temperature.

Pharmaceutical and blood products as well as organs destined for transplant use are recovered or fabricated at one temperature, stored at another lower temperature, and normally used at ambient temperature. Blood plasma, for instance, is recovered at body temperature which is $+37°$ C., is stored at below $-30°$ C., and is used at about $+20°$ C. Similarly whole blood is recovered and used at the same temperatures, but must be stored at between $+2°$ C. and $+6°$ C., neither hotter nor colder or the blood will be unusable. Whenever in the chain between initial recovery of these products and eventual use these temperature parameters are violated, the result is a serious degradation of the product. As a result the products are extremely expensive and rare, and careful consumers take enormous pains to ensure that the product is good, without ever having absolute surety that temperature limits have not been passed.

Similarly in the frozen-food business it is essential that the foodstuff, for example meat, be frozen rapidly to a very low temperature, and be maintained below a predetermined lower limit. The rapid freezing is needed to prevent excessive formation of cell-damaging crystals, and maintaining the desired cold is necessary to prevent subsequent formation of ice crystals which can puncture cells and leave the foodstuff wet and pulpy. Similarly the shelf life of the product is greatly decreased if it is frozen, thawed, and refrozen. In this particular situation an irreversible temperature witness is needed since the consumer cannot ascertain from looking at a product that is frozen if it will be good when thawed.

Electronic equipment is also temperature sensitive. It is manufactured at one temperature, is normally used at a higher temperature, but should not exceed a yet higher temperature. When the temperature of a computer, for instance, starts exceeding this threshold temperature, some sort of service is normally advisable in order to avert a later breakdown, even though, for instance, all that may be needed is a new disk-drive filter.

A classic temperature witness is described in U.S. Pat. No. 1,535,536 and in French patent No. 1,391,673. A body that is made of a material whose melting point is the desired threshold temperature is juxtaposed with a dye so that when the threshold temperature is passed the body melts and absorbs the dye. The resultant color change remains even if the body is refrozen. The device must be made at low temperature and stored at such temperature, making its use and transport somewhat difficult.

In French patent No. 1,515,914 such an arrangement is proposed where the dye is held in a frangible capsule in the body to provide so-called autoreadying action. The capsule keeps the dye away from the body during manufacture and before use. The first time the unit is frozen, however, the capsule ruptures. Since by this time the body and the dye are fairly frozen, there is no mixing of the two until they thaw, whereupon they mix and make an irreversible color change.

The best of such temperature-witnessing devices are not widely used. They are often very difficult and hence expensive to manufacture. Frequently they can be tampered with and reset, and never are they able to respond reliably to several different temperatures.

OBJECTS OF THE INVENTION

It is therefore an object of the present invention to provide an improved threshold-temperature witness.

Another object is the provision of such a threshold-temperature witness which overcomes the above-given disadvantages, that is which automatically transforms in a irreversible manner at an accurate ($+/-0.1°$ C.) temperature.

In addition such a device should be inexpensive enough that it can be discarded after use, and should be rugged and of long service life. The unit should also be adjustable as to the speed of its change with temperature and should work within a range of several hundred degrees from a minimum temperature of $-70°$ C.

SUMMARY OF THE INVENTION

A temperature-monitoring and -witnessing device according to this invention has an at least partially transparent container forming a pair of adjacent chambers at least one of which is substantially closed and formed with a passage between the chambers, a valve including a metallic shape-memory element that deforms from one shape to another shape when cooled to a predetermined transition temperature for blocking the passage when the element is of the one shape and for unblocking the passage when the element is of the other shape, a body of liquid in the one closed chamber and confined therein when the shape-memory element is of the one shape, and a dye or the like in the other chamber capable of coloring the liquid. Thus the liquid will only be colored when the element has deformed to the other shape and the device is below the transition temperature. Normally the liquid has a freezing point generally at the transition temperature. For self-readying action, remelting of the liquid serves to indicate that an upper threshold has been crossed.

The system of this invention therefore uses the surprising properties of shape-memory metals of the type sold by Raychem Corp. (Menlo Park, Calif.), Delta Memory Metal Co. (Ipswich, Suffolk, England), and Instuutmetalkonde & Metallurgie (trade name "Proteus"; Hoboken, Overpelt, Belgium). Such metals are invariably alloys and typically of the following compositions by atomic percent:

Ag—45 atomic % Cd,
Cu—25 atomic % Al,
Cu—15 atomic % Sn,
Cu—Zn—Al,
Ni—50 atomic % Ti,
Fe—27 atomic % to 33 atomic % Ni,
Co—19 atomic % to 30 atomic % Ni, Au—46 atomic % to 50 atomic % Cd,
Ti—45 atomic % Ni—5 atomic % Fe, and
Mn—5 atomic % to 20 atomic % Cu.

These metals change crystalline structure markedly at their respective transition temperatures, simultaneously rapidly deforming. They can be deformed up to 10% and almost perfectly revert to their original shapes.

It is also possible to use ceramic materials, high polymers such as polyethylene or isostatic polybutene, and even certain biological materials such as keratin. So long as the material has this martensitic characteristic which gives it shape memory, it can be used.

With shape-memory alloys it is possible to achieve an extremely accurate degree of temperature control very reproducibly. Accuracy to 0.1° C. is possible and the shape-memory element itself can be a relatively small item so the fabrication costs for the temperature witness can be very low.

According to another feature of this invention the shape-memory element is a plug in the passage and when of the one shape snugly fits therein and when of the other shape does not fit snugly therein. More particularly, the container forms two such substantially closed chambers with respective liquid bodies and the device has two such plugs between the liquid-filled chambers and the chamber with the dye. These plugs have different transition temperatures.

The valve according to this invention can also include a valve element displaceable between a position blocking the passage and a position not blocking the passage. In this case the shape-memory element is a spring braced between the valve element and the container. Furthermore the container defines a second such substantially closed chamber distinct from the first-mentioned closed chamber and with a second such passage distinct from the first-mentioned passage and opening into the chamber of the coloring means. A second such body of liquid in the second compartment and distinct from the first-mentioned body of liquid surrounds a frangible capsule filled with a second such coloring means. The valve body engages and fractures the capsule when the shape-memory element is at a temperature below the transition temperature. Such an arrangement therefore provides accurate witnessing of upper and lower thresholds.

According to this invention the shape-memory element deforms substantially without hysteresis, that is it moves between its alternate shapes at the same temperatures, whether being heated or cooled. It is also possible for this element to deform with hysteresis, which is handy when the device is autoreadying or used with a liquid with the same freezing point.

Particularly good action is achieved when the shape-memory element is a coil-type spring. Forming it of two separate springs or metals having adjacent transition ranges makes it possible to monitor over a wide overall range.

The container according to this invention forms a plurality of dye chambers opening into the passage and the valve means includes a valve body displaceable through respective positions blocking the dye chambers. The shape-memory element is braced against the valve body to displace it through the positions and successively open the dye chambers into the passage. Thus several temperatures can be monitored and witnessed. In this arrangement the valve body can include a plug displaceable into the closed chamber when the shape-memory element deforms to the other shape. This plug therefore acts as the self-arming or self-readying unit, and can be in fact formed as a piercable membrane. When the shape-memory element deforms fully it moves the plug out of the way and allows the system to operate.

It is also possible to provide a switch operatively connected to and operable by the valve means on deformation of the shape-memory element. This switch can operate a heating or refrigeration plant to control the degree of heating or cooling of same.

DESCRIPTION OF THE DRAWING

The above and other features and advantages will become more readily apparent from the following, it being understood that any feature described with reference to one embodiment of the invention can be used where possible with any other embodiment. In the accompanying drawing.

SPECIFIC DESCRIPTION

Figure 1:
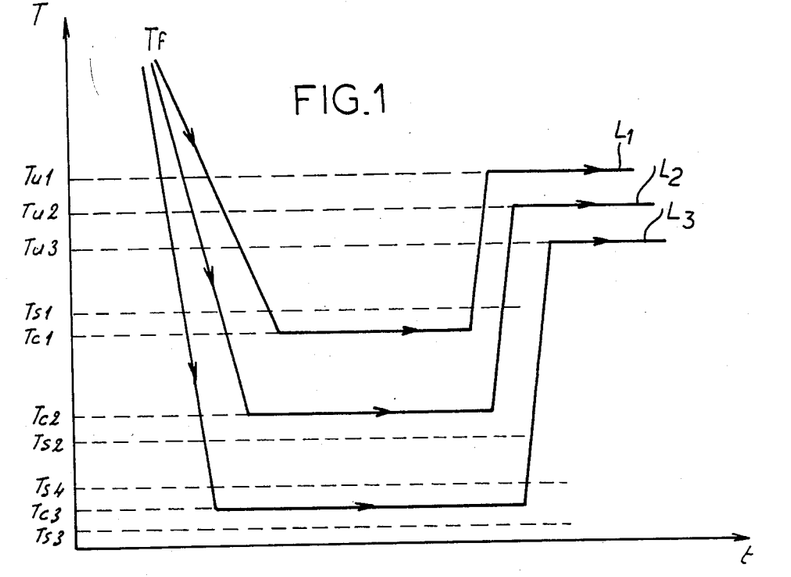
FIGS. 1, 2, and 3 are line graphs illustrating principles of this invention.

As seen in FIG. 1, where time t is indicated on the abscissa and temperature T on the ordinate, three basic temperature schemes are normally to be monitored, all representing things initially prepared at a fabrication temperature $T_f$ that is relatively high. FIG. 1 therefore illustrates the main types of temperature monitoring possible according to this invention.

In the simplest example indicated by the uppermost line $L_1$ the product, for example blood plasma, is recovered at body temperature $T_f$, and is thereafter maintained at a storage temperature $T_{c1}$ which must be below an upper threshold temperature $T_{s1}$ until it is used at ambient temperature $T_{u1}$. Thus:

$$T_f > T_{u1} > T_{s1} > T_{c1}.$$

The middle line $L_2$ represents the temperature line for a product which is recovered or fabricated at a high temperature $T_f$, which must be stored at a temperature $T_{c2}$ which must lie above a threshold temperature $T_{s2}$, and which is used at an intermediate temperature $T_{u2}$. Thus:

$$T_f > T_{u2} > T_{c2} > T_{s2}.$$

The bottom line $L_3$ which for example represents the curve for whole blood, is for a product recovered at a high temperature $T_f$, which must be stored at a low temperature $T_{c3}$ that lies above a lower limit $T_{s3}$ and below an upper limit $T_{s4}$, and that is ultimately used at a higher temperature $T_{u3}$. Thus:

$$T_f > T_{u3} > T_{s4} > T_{c3} > T_{s3}.$$

It would also be possible to make or recover the product at a temperature $T_f$ that is lower than any of the other temperatures, in which case this parameter would be at the opposite ends of the above-given three relationships.

Figure 2:
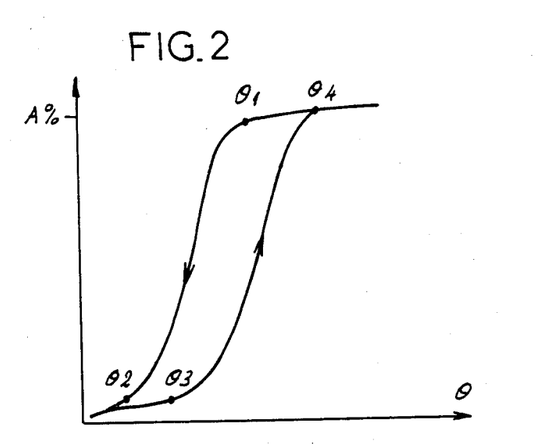

FIG. 2 plots the deformation A in percent on the ordinate against the temperature $\theta$ on the abscissa of a material with shape or plastic memory according to the invention. As this material is cooled from a temperature $\theta_1$ to a temperature $\theta_2$ martensitic transformation takes place, being complete at the second temperature. When reheated from temperature $\theta_3$ which is greater than $\theta_2$ to $\theta_4$ which is greater than $\theta_1$ the inverse transformation takes place, the offset accounting for the hysteresis. If the material had no hysteresis the temperatures $\theta_1$ and $\theta_4$ would be identical as would the temperatures $\theta_2$ and $\theta_3$. There is some degree of transformation at intermediate temperatures, irrespective of elapsed time, with maximum deformation occurring at temperature $\theta_2$.

Figure 4:
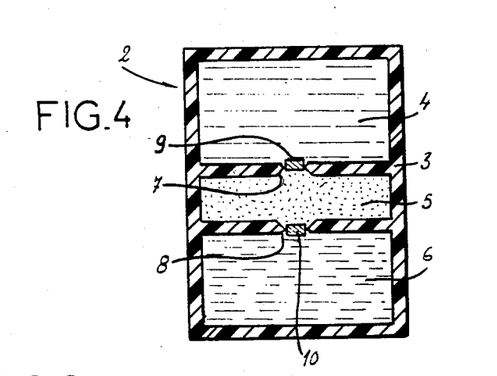
FIGS. 4, 5, 6, and 7 are sections through four different devices according to the invention.

FIG. 4 shows a two-level autoreadying temperature witness 2 having a transparent container or envelope 3 made, for example, of polystyrene and forming two outer chambers 4 and 6 and an inner chamber 5 therebetween. The chamber 4 is filled with a liquid such as benzene or tetradecane with a melting point of about +6° C. and the chamber 6 is filled with another liquid like water that has a melting point below +2° C. The inner chamber 5 is filled with a coloring agent that may be a food-type dye, an acidic or basic agent that chemically colors the liquids of the chambers 4 and 6, or could simply be color beads that physically mix with clear liquids in the chambers 4 and 6.

The inner chamber 5 can communicate with the chambers 4 and 6 via respective passages or openings 7 and 8 that are shown blocked by respective plugs 9 and 10 that are of such an alloy and so constructed that they shrink and no longer fit the respective openings when cooled respectively to +6° C. and +2° C. These plugs 9 and 10, which could more simply be constructed as circular disks that fit wholly as partitions across the container 3 and that cup when cooled to the respective transition temperatures, change shape with hysteresis, so that on reheating the temperature must rise to somewhat above the temperature they change shape at on cooling before they again block the respective openings 7 and 8.

Figure 3:
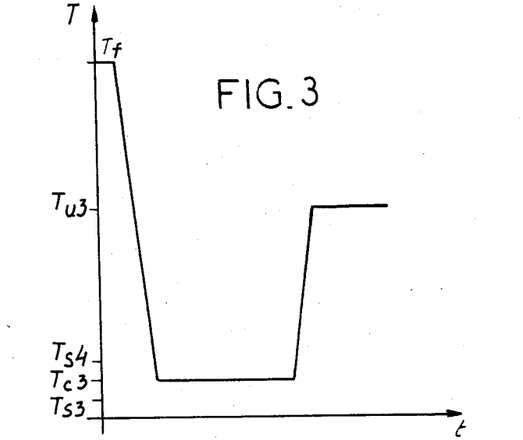

This device is used to monitor the temperature of whole blood whose temperature curve is shown in FIG. 3 where time t is shown on the abscissa and temperature T on the ordinate. The blood is recovered at a relatively high temperature $T_o$ of about 37°. It is loaded into sterile pouches and immediately cooled to a relatively low temperature $T_1$ of +4° C. The temperature device 2 is permanently attached, for example by stapling, to the blood pouch.

As the temperature of the device drops the liquid in the chamber 4 will first freeze, and then the plug 9 will shrink to open up the passage 7 between this chamber 4 and the dye chamber 5. The plug 9 should open after the liquid in the chamber 4 freezes, an effect that can easily be achieved by insulating this plug 9 slightly so it is cooled more slowly than the liquid. Thus as the temperature drops to +4° C. the device automatically readies or arms itself, opening a communication path between the chambers 4 and 5, but since the liquid of the chamber 4 is frozen, the dye will not mix with and stain it. As long as the temperature of the unit 3 remains below +6° C., therefore, there will be no staining in the chamber 4, but as soon as the temperature rises and the liquid therein melts, there will be mixture and staining that subsequent freezing cannot reverse.

If the temperature of the unit 3 continues to drop from +6° C. to and below +2° C., the plug 10 will shrink and will open up the passage 8, permitting the dye of the chamber 5 to stain the unfrozen liquid in the chamber 6. Even if the temperature plummets low enough to freeze the liquid in the chamber 6, it will already have been stained. Thus the user of the whole blood need merely look at the unit on taking it out of cold storage immediately before use. If neither chamber 4 or 6 is stained, the blood can be used.

Even if through wholly accidental causes, for instance temporary equipment failure, the blood has been allowed to get too cold or too hot and this was not noticed at the time, the unit 3 will accurately report it, assuring the end user that the product is safe.

Figure 5:
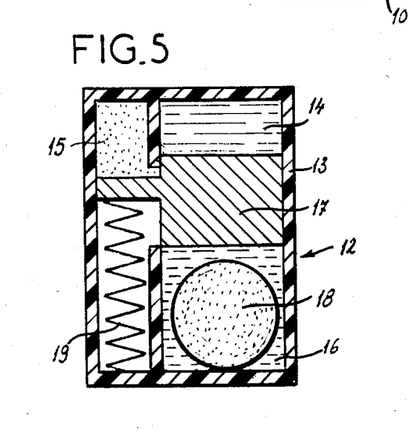

FIG. 5 shows a temperature-monitoring unit 12 having a transparent container 13 subdivided by a piston 17 into three chambers 14, 15, and 16 filled like the respective chambers 4, 5, and 6, that is with a liquid with a +6° C. melting point in the chamber 14, a coloring agent in the chamber 15, and a fluid that freezes below +2° C. in the chamber 16. In addition the chamber 16 contains a frangible capsule 18 filled with dye. The piston 17 is urged into the illustrated position in which it segregates the chambers 14 and 15 from each other and is spaced from the capsule 18 by a shape-memory spring 19 that will start to shorten at +6° C. and that will be fully shrunk at +2° C. An alloy of 69.9% copper, 26.1% zinc, and 4% aluminum can be used for the spring 19.

Thus as in the FIG. 3 arrangement, when chilled the liquid in the chamber 14 will first freeze, and then the spring 19 will retract the partition or piston 17 and permit communication between the chambers 14 and 15. When reheated the liquid in the chamber 14 will melt and stain, but so long as the device remains below +6° C. there will be no such coloring. As the temperature drops to and below +2° C. the piston 17 will contact and break the capsule 18, staining the liquid in the chamber 16 with the dye it contains. The shape-memory spring 19 can exert considerable force as it reverts to its cold shape, easily breaking the capsule 18.

Figure 6:
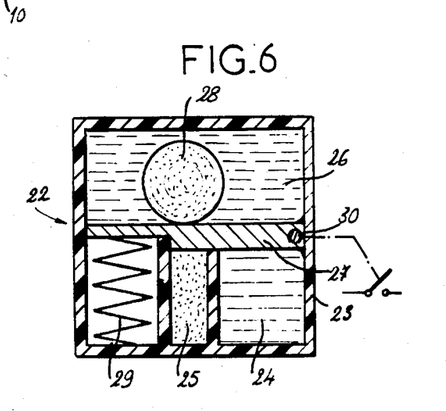
Figure 7:
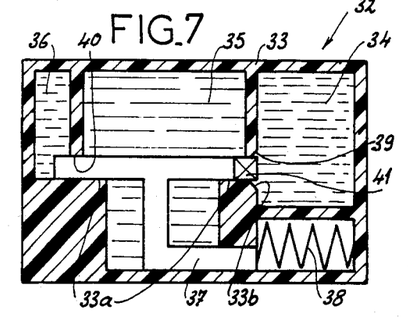

In FIG. 6 a temperature-monitoring unit 22 has a transparent container 23 subdivided by a flap-type piston or partition 27 carried on a pivot 30 into three chambers 24, 25, and 26 filled like the respective chambers 14, 15, and 16 of FIG. 5. The chamber 26 contains a frangible capsule 28 filled with dye and the piston 27 is urged into the illustrated position in which it segregates the chambers 24 and 25 from each other and is spaced from the capsule 28 by a transformation-metal spring 29 that will start to shorten at 30 6° C. and that will be fully shrunk at +2° C. This arrangement functions identically to that of FIG. 5, but with the partition 27 pivoting rather than sliding and the spring 29 lengthening rather than shortening. This unit 22 is provided with a switch that can be operated by a synthetic-resin pusher connected to the pivot 30 or flap 27. This makes the unit usable for control of a refrigeration or heating plant as described in more detail below.

The temperature-monitoring unit 32 of FIGS. 7 through 10 has a transparent container 33 subdivided by a T-shaped piston 37 and a plug 41 into three chambers 34, 35, and 36 all filled with a liquid that does not freeze until below +2° C., for instance water, and with the liquid of the center chamber 35 mixed with a dye. Passages 39 and 40 can allow fluid communication between the respective chambers 34 and 36 and the middle chamber 35. The piston 37 is held in the FIG. 7 position at temperatures above +6° C., segregating the chambers 35 and 36 from each other and resting against the plug 41 which segregates the chambers 34 and 35 from each other by a transformation-metal spring 39 that will start to shorten at +6° C. and that continue to shrink to well below +2° C., generally without hysteresis. This piston 37 is readily slidable on guide surfaces 33a in the container 33, and the opening 39 between the chambers 34 and 35 is beveled at 33b to allow the plug 41 to be released easily. This plug 41 could be replaced by a frangible membrane across the opening 39.

Figure 8:
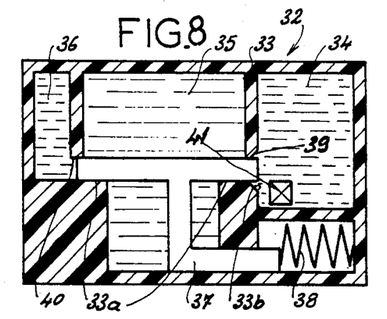
FIGS. 8, 9, and 10 show the arrangement of FIG. 7 in different positions.
Figure 9:
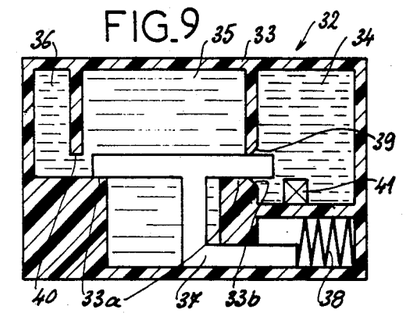
Figure 10:
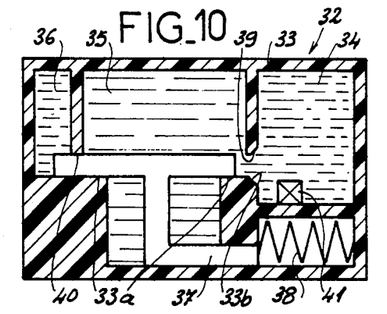

Thus in this arrangement as the temperature drops the position of FIG. 8 is assumed, with the spring 38 pulling back the piston 37 and pushing out the plug 41. In this position the device is armed, with the piston 37 blocking both openings 39 and 40. Further cooling to below +2° C. will pull the piston 37 back more and unblock the opening 40 as seen in FIG. 9, permitting the dye of the center chamber 35 to stain the liquid of the chamber 36, and subsequent heating above +6° C. as seen in FIG. 10 will oppositely shift the piston 37 and unblock the opening 39.

Figure 11:
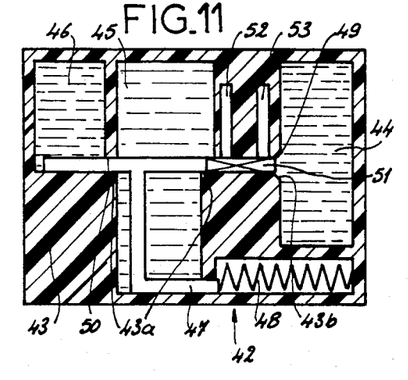
FIGS. 11 and 12 are sections through two more devices in accordance with this invention.

The unit 42 of FIG. 11 is used to monitor the temperature of whole blood, and is set up to indicate also when the blood is warm enough to use. This unit 42 has a transparent container 43 subdivided by a T-shaped piston 47 and a plug 51 into three main chambers 44, 45, and 46 all filled with a liquid that does not freeze until below +2° C., for instance water, and with the liquid of the center chamber 45 mixed with a dye. Passages 49 and 50 can allow fluid communication between the respective chambers 44 and 46 and the middle chamber 45. In addition the container 43 is formed with two chambers 52 and 53 which can be segregated from the chambers 45 and 44 by the plug 49. These chambers 52 and 53 contain respective liquids of respective primary colors, for instance red and yellow.

The piston 47 is held in the illustrated position at temperatures above +22° C., segregating the chambers 45 and 46 from each other and resting against the plug 51 which segregates the chambers 44, 52, and 53 from one another other. A shape-memory spring 49 that will start to shorten at +22° C. and that will continue to shrink to well below +2° C., generally without hysteresis is braced against the piston 47. This piston 47 is readily slidable on guide surfaces 43a in the container 43, and the opening 50 between the chambers 44 and 45 is beveled at 43b to allow the plug 51 to be released easily.

Thus in this arrangement as the temperature lowers below ambient temperature around +22° C. the piston 47 is pulled to the right by the spring 48, pushing out the plug 51. In this position the device is armed, with the piston 47 nonetheless keeping all the chambers 44, 45, 46, 52, and 53 separated. By the time the temperature drops to +6° C. the plug 51 will be completely ejected into the chamber 44. Further cooling to below +2° C. will pull the piston 47 back more and unblock the opening 50, permitting the dye of the center chamber 45 to stain the liquid of the chamber 46. Subsequent heating above +6° C. will oppositely shift the piston 47 and first open the chamber 53 into the chamber 44 staining the liquid therein yellow. Further movement fully back into the illustrated position at ambient temperature will unblock the chamber 52 and allow its red dye to stain the liquid in the chamber 44 red.

Thus to start with neither of the chambers 44, or 46 should be colored, indicating the blood has been properly stored. If the chamber 46 is the same color, for instance blue, as the chamber 45, the blood has been too cold, and if the chamber 44 is yellow or orange, it has been too warm. As the blood warms up, it is ready to use when the color of the chamber 44 moves from yellow to orange.

Figure 12:
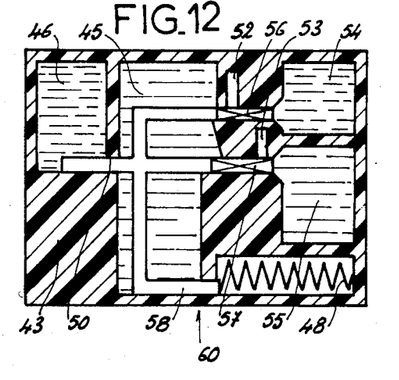

The arrangement of FIG. 12 is quite similar to that of FIG. 11, with the same references being used for identical structure. Here, however an E-shaped piston 48 is used to move two plugs 56 and 57 that block between respective dye chambers 52 and 53 and respective indicator chambers 54 and 55. The dye chambers 52 and 53 again contain different colors, so that with this system when the chamber 55 is colored it means that the unit 60 is or has been heated above +6° C. and when both chambers 54 and 55 are colored the unit is at or has been at ambient temperature since it was first chilled.

Figure 13:
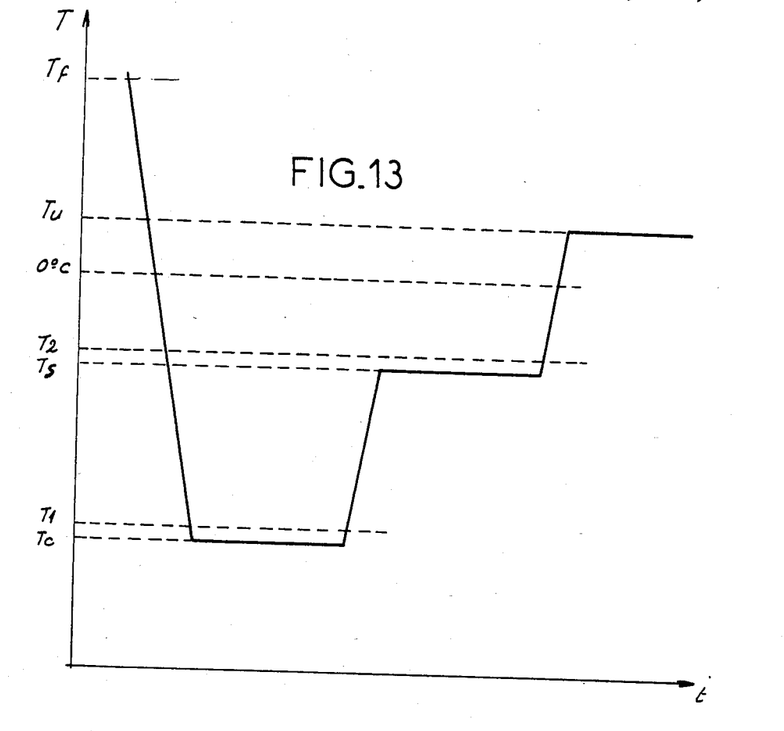
FIG. 13 is another line graph illustrating further principles in accordance with the invention.

The arrangement of FIGS. 14 through 17 is used to monitor the temperature of frozen food. As shown in FIG. 13, where temperature T is plotted on the ordinate against time t on the abscissa, the food is normally prepared at ambient temperature $T_f$ and then is fast-frozen by rapid cooling to a minimum temperature $T_c$ which lies below a threshold temperature $T_1$ of −35° C. necessary for effective fast freezing without loss of flavor. Then the food is stored at a temperature $T_s$ which must lie below a second threshold temperature $T_2$ of −15° C., and is finally thawed and used at a temperature $T_u$ that may be about ambient.

The device 62 of FIGS. 14 through 17 is generally identical to that of FIG. 11 and uses identical reference numerals for identical structure. The main difference is that outboard of the two chambers 52 and 53 is a third chamber 64, and that a two part shape-memory element or spring 68 is used which is of maximum length above −5° and at minimum length below −35° C. and has a hysteresis of about 15° C. The use of two types of shape-memory metal in the spring 68 allows a very broad range of temperatures, greater than 30° C., to be monitored as the two metals are selected to have adjacent ranges, with the upper transition temperature of the one being the lower transition temperature of the other.

Figure 14:
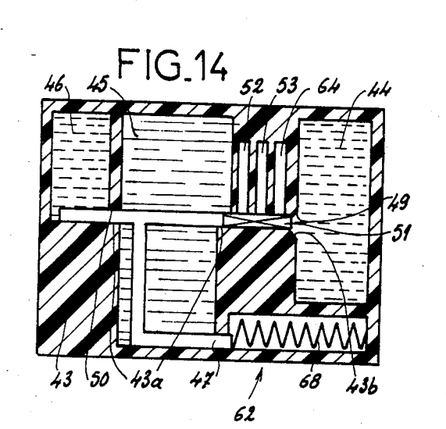
FIGS. 14, 15, 16, and 17 are sections through another device according to the instant invention in different operative positions.
Figure 15:
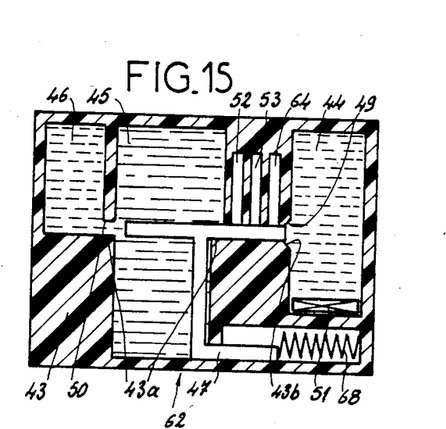
Figure 16:
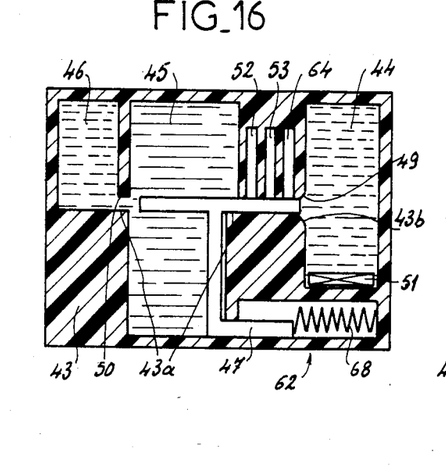
Figure 17:
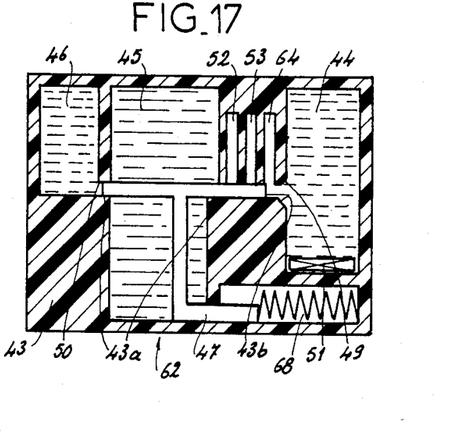

On initial cooling to below $T_1$ the piston 47 moves from the position of FIG. 14 to that of FIGS. 15 and 16, pushing the plug 51 wholly into the chamber 44 and allowing the dye in the chamber 45 to stain the liquid in the chamber 46. This position is maintained so long as the temperature of the unit does not go above −15° C. As −15° C. is passed the first chamber 64 is released into the chamber 44, staining the liquid therein blue, then green by addition of yellow at −10° C. as the chamber 53 is opened, and then brown by addition of red at −5° C. as the chamber 52 is opened. Obviously more chambers yet could be used.

When the effects of hysteresis are unwanted it is possible to brace the shape-memory element in one direction by a spring to achieve this effect.

Figure 18:
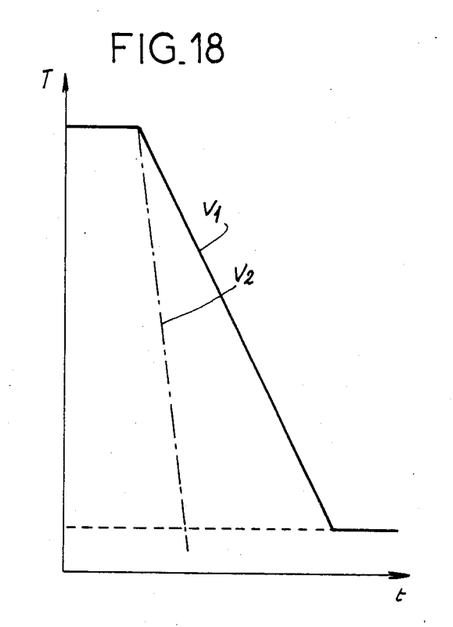
FIGS. 18 and 19 are further line graphs illustrating more principles of this invention.
Figure 19:
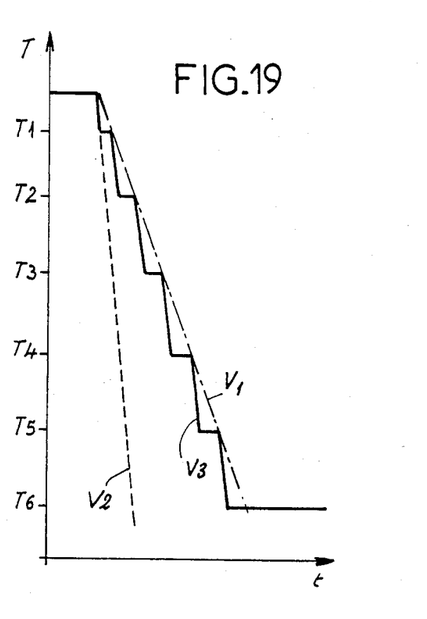

FIG. 18 illustrates how in the refrigeration of food it is frequently necessary to freeze the food at a certain rate indicated by line $V_1$, whereas the refrigeration equipment is capable of freezing it at a faster rate indicated by $V_2$. The system according to this invention can be used, without coloring dye, to operate switches such as shown in FIG. 6 at 31, for instance by coupling a polymeric pusher button to the shape-memory element to open or close this switch 31. A battery of such switches actuated by respective different shape-memory elements can control the refrigeration equipment by briefly stopping the refrigeration action at respective temperature levels $T_{1-6}$. The result is a stepped curve $V_3$ that closely approximates the curve $V_1$.

The shape-memory alloys therefore are used according to this invention for temperature-related purposes where they give particularly effective results. The transition temperatures are very accurate and the shape change can be fairly abrupt, for extremely accurate temperature control or indication.

I claim:

1. A temperature-monitoring and -witnessing device comprising:
    an at least partially transparent container forming a pair of adjacent chambers and formed with a passage between the chambers, the chambers being substantially closed and interconnected only by the passage;
    valve means including a metallic shape-memory plug completely within the passage that deforms from one shape to another shape when cooled to a predetermined transition temperature for fitting snugly in and blocking the passage when the plug is of the one shape and for retracting at least partially from contact with and unblocking the passage when the plug is of the other shape;
    a body of liquid in one of the closed chambers and confined therein when the shape-memory plug is of the one shape, the body of liquid having a freezing point above the transition temperature; and
    means in the other chamber capable of coloring the liquid when same is not frozen and incapable of coloring the liquid while frozen, whereby the liquid will only be colored when the plug has deformed to the other shape and the device is below the transition temperature.

2. The temperature-monitoring and -witnessing device defined in claim 1 wherein the container forms two such substantially closed chambers with respective liquid bodies, the device having two such plugs between the liquid-filled chambers and the chamber with the means, the plugs having different transition temperatures.

3. The temperature-monitoring and -witnessing device defined in claim 1 wherein the container forms a plurality of dye chambers opening into the passage and the valve valve body is displaceable through respective positions blocking the dye chambers, the shape-memory element being braced against the valve body to displace it through the positions and successively open the dye chambers into the passage.

4. The temperature-monitoring and -witnessing device defined in claim 1 wherein the coloring means is a dye.

5. A temperature-monitoring and -witnessing device comprising:
    an at least partially transparent container forming a pair of adjacent chambers and formed with a passage between the chambers, the chambers being substantially closed and interconnected only by the passage;
    valve means including
        a valve body displaceable in the passage in a predetermined direction between a position blocking the passage and a position unblocking the passage, and
        a metallic shape-memory element in the container and external of the chamber that is braced between the container and the valve body and that changes length in the predetermined direction when cooled to a predetermined transition temperature for holding the valve body in the blocking position when the element is above the predetermined temperature and that moves the valve body in the direction into the unblocking position when the element is below the transition temperature;
    a body of liquid in one of the closed chambers and confined therein when the shape-memory element is above the transition temperature; and
    means in the other chamber capable of coloring the liquid when same is not frozen and incapable of coloring the liquid while frozen, whereby the liquid will only be colored when the element has cooled to below the transition temperature.

6. The temperature-monitoring and -witnessing device defined in claim 5 wherein the container defines a second such substantially closed chamber distinct from the first-mentioned closed chamber, the device further comprising:
    a second such body of liquid in the second chamber and distinct from the first-mentioned body of liquid; and
    a frangible capsule filled with a second such coloring means in the second chamber, the valve body engaging and fracturing the capsule when the shape-memory element is at a temperature below the transition temperature, whereby fracture of the capsule permits the second coloring means to stain the second liquid body.

7. The temperature-monitoring and -witnessing device defined in claim 5 wherein the shape-memory element is a coil-type spring.

8. The temperature-monitoring and -witnessing device defined in claim 7 wherein the spring is made of two different shape-memory metals having adjacent transition ranges.

9. A temperature-monitoring and -witnessing device comprising:
    an at least partially transparent container forming a plurality of adjacent dye chambers at least one of which is closed and formed with a passage into which the chambers open;
    valve means including
        a valve body displaceable through respective positions blocking the dye chambers, a metallic shape-memory element that deforms from one shape to another shape when cooled to a predetermined transition temperature, the shape-memory element being braced against the valve body to displace it through the positions and successively open the dye chambers into the passage for blocking flow between the passage and the chambers when the element is of the one shape and for unblocking flow between the respective chambers and the passage when the element is of the other shape, and
    a plug displaceable into the closed chamber when the shape-memory element deforms to the other shape;
    a body of liquid in one of the chambers and confined therein when the shape-memory element is of the one shape; and
    means in at least one of the other chambers capable of coloring the liquid, whereby the liquid will only be colored when the element has deformed to the other shape and the device is below the transition temperature.

* * * * *